United States Patent
Spain

[15] 3,639,197
[45] Feb. 1, 1972

[54] CARBON COMPOSITE STRUCTURE INCLUDING A BAND OF HELICALLY WOUND CARBON FIBERS

[72] Inventor: Raymond G. Spain, Raleigh, N.C.

[73] Assignee: Monsanto Company, St. Louis, Mo.

[22] Filed: Oct. 8, 1969

[21] Appl. No.: 866,116

[52] U.S. Cl. .................................161/35, 156/169, 161/42, 161/149, 188/257, 192/107
[51] Int. Cl. ......................................................D04h 3/02
[58] Field of Search ...........161/42, 44, 170, 182, 35, DIG. 4, 161/86, 149; 188/251, 251 M, 251 A; 192/107; 156/169, 195

[56] References Cited

UNITED STATES PATENTS

| | | |
|---|---|---|
| 3,072,558 | 1/1963 | Myers et al. ...........................204/280 |
| 3,403,595 | 10/1968 | Watson..........................................87/1 |
| 3,107,152 | 10/1963 | Ford et al. ............................23/209.2 |
| 2,728,701 | 12/1955 | Wirth..............................188/251 A X |
| 3,552,533 | 1/1971 | Solon et al..............................192/107 |
| 3,473,637 | 10/1969 | Rutt....................................192/107 X |

*Primary Examiner*—Philip Dier
*Attorney*—Vance A. Smith, Russell E. Weinkauf, John D. Upham and Neal E. Willis

[57] ABSTRACT

A substantially all-carbon planar structure is provided which comprises essentially continues carbon fibers in a carbonaceous matrix. The fibers in the region adjacent to the periphery of the structure are ordered in a direction which substantially follows the contour of the periphery thereby providing increased strength against stresses in the region adjacent to the periphery. The fibers in the remainder of the structure may or may not be ordered.

4 Claims, 4 Drawing Figures

INVENTOR.
RAYMOND G. SPAIN

INVENTOR.
RAYMOND G. SPAIN
BY
Vance C. Smith
ATTORNEY

CARBON COMPOSITE STRUCTURE INCLUDING A BAND OF HELICALLY WOUND CARBON FIBERS

FIELD OF THE INVENTION

The present invention relates to a composite structure having improved strength in the peripheral regions thereof and a method of fabricating the same. More particularly, this invention relates to an essentially planar all-carbon, composite, structure having improved strength in the peripheral regions thereof and a method of fabricating the same.

BACKGROUND OF INVENTION

Due to the increased size and landing speeds of modern aircraft, much emphasis is being placed upon the development of superior brakes to reduce the motion of the aircraft. Aircraft ordinarily employ disc brakes which function much like those of a pedal-actuated bicycle brake consisting of a stack of alternating rotors and stators. The rotors and stators having splined peripheral regions are coupled to the wheel and axle respectively. When the members are pressed together, the motion of the aircraft is reduced due to the frictional force of the friction elements attached or positioned between and against the rotor and stators. Simultaneously, a large amount of energy is released as heat, and a large stress is created in the splined areas of the rotors and stators. The splined areas are ordinarily located along the outer periphery of the rotor and the inner periphery of the stator.

Present developments are focusing upon various materials which can withstand both the stress and the deleterious effects caused by the generation of heat. A material which has shown considerable promise is an all-carbon composite. Recent evaluation, however, of all-carbon composites based upon laminated carbon or graphite cloth have shown that the interlaminar strength of the disc has not been entirely satisfactory, particularly in the splined regions of the discs. Besides failure through breakage, such discs also have a tendency to fail through delamination in the splined region.

It is therefore a primary object of the present invention to provide an essentially planar, all-carbon, composite structure with improved strength in the peripheral regions thereof.

BRIEF STATEMENT OF THE INVENTION

Briefly, in accordance with the present invention, I provide an essentially planar, substantially all-carbon, composite structure which is to be utilized under conditions which subject the peripheral regions thereof to high stresses. The planar structure comprises carbon fibers in a "carbonaceous matrix." As used herein, "matrix" defines a constituent of a composite which surrounds the other composite elements, such as fiber reinforcement components, and acts or has acted as a cementing medium. The fibers are essentially continuous in the peripheral regions subject to the high stresses and have an "ordered direction" which substantially follows the contour of the periphery of the planar structure. I have found that the structure as stated above has greatly improved stress capacity along the plane of the planar structure and also has increased resistance to delamination.

The expression "ordered direction" as employed herein is intended to cover the general orientation of the fibers. Although the fibers do cross one another, the general and predominant direction in which the fiber paths extend is along the contour of the periphery of the planar structure. The term planar structure itself is meant to include those structures having a thickness dimension along a line normal to the major or planar surfaces thereof which is small compared with the transverse dimension across the faces or major surfaces. The term periphery is employed in its general meaning. That is, it is the perimeter or circumference of a planar structure. In the case of specific planar structures such as, for example, an annular planar disc, both the other and inner perimeter are construed herein as the periphery.

DESCRIPTION OF THE DRAWINGS

The features of the present invention which I desire to protect are pointed out with particularity in the appending claims. The invention itself, together with further objects and advantages thereof, may be best understood with reference to the following description taken in connection with the appended drawings in which:

DESCRIPTION

Figure 1:
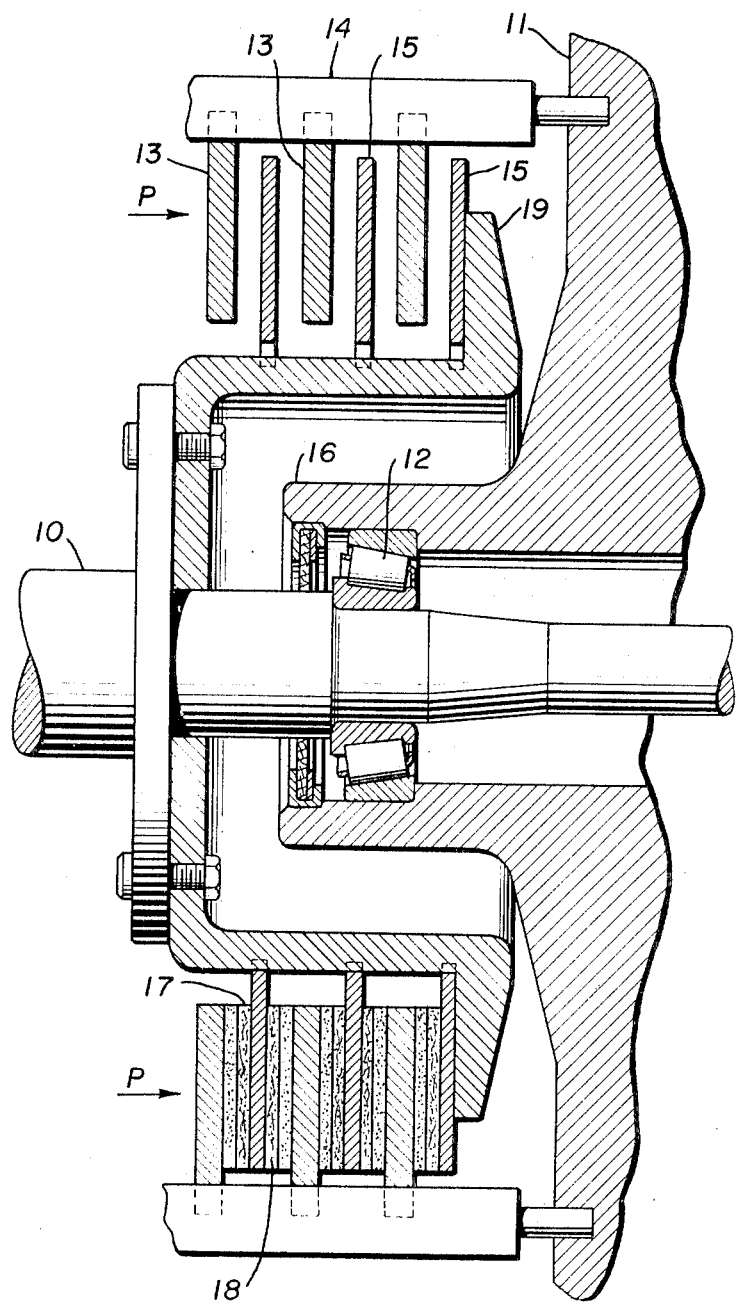
FIG. 1 is a simplified vertical view, partly in section, of a typical aircraft brake system.

For purposes of clarity and simplicity, the following descriptive matter discusses the utility of my present invention in turns of a pressure-actuated brake assembly with rotors and stators. Referring now to FIG. 1 which illustrates a simplified aircraft brake assembly, it is shown therein a horizontal axle 10 to which a wheel 11 is appropriately journaled through roller bearings 12 (only one of which is shown). The brake assembly portion comprises (I) a plurality of annular disc-shaped rotor members 13 which are keyed or splined to wheel 11 via member 14 and (II) a plurality of annular disc-shaped stator members 15 which are keyed or splined to the stationary axle 10 via member 16.

Each of the rotor members 13 and stator members 15 is provided respectively with a pair of rotor frictional elements 17 and stator frictional elements 18.

Elements 17 and 18 are respectively positioned against the opposite faces of rotors 13 and stator 15 which in turn are adapted to be compressed against backplate 19 via a hydraulically actuated pressure mechanism or other appropriate means (not shown).

Figure 2:
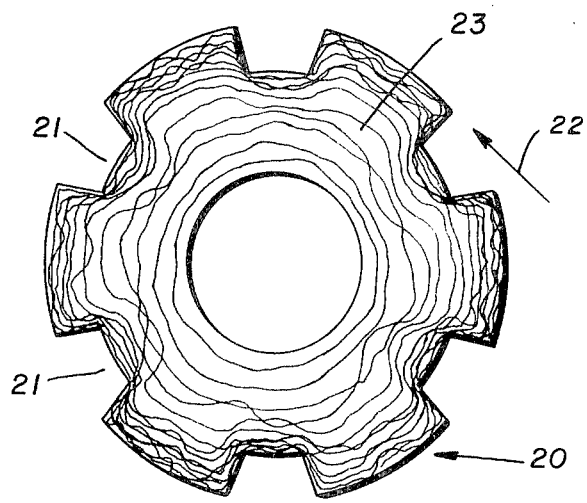
FIG. 2 is a plan view of a rotor element having a structure in accordance with one embodiment of the present invention.

FIG. 2 is a plan view illustration of a rotor frictional element 20 which may be utilized in the apparatus described in FIG. 1. Rotor frictional element 20 is an annular disc having six splines 21 along the outer circumference or periphery thereof. Splines 21 function to couple element 20 to wheel 11 by means of axle 10 (as seen in FIG. 1).

When the brake assembly of which rotor frictional element 20 is a part is actuated, element 20 is pressed tightly against an adjacent stator friction element to provide the frictional force needed to reduce the rotational speed of the wheel and, therefore, the aircraft. The frictional surface area is inside the region encompassed by the root diameter of splines 21. Thus, because the driving force (see reference numeral 22) is acting in a direction tangential to element 20 and the frictional force (reference numeral 23) is acting in the opposite direction, large stresses are developed in the region of splines 21. It is therefore imperative that frictional element 20 comprise materials which are able to withstand the stresses which develop in the disc.

Rotor frictional element 20 is comprised of an essentially all-carbon composite which includes continuous carbon or graphite fibers (carbon being employed hereinafter as generic to both) in a carbonaceous matrix. To better illustrate the fibrous nature of element 20, the fibers therein are greatly exaggerated via heavy lines. The carbon fibers, at least in the regions adjacent splines 21, have an ordered direction which follows the contour of the splined periphery of element 20. The fiber continuity and designated ordered direction provide increased strength when compared to similar elements made with laminar or all-staple-fiber-constructed composites. As is explained hereinafter, the continuous fiber path crosses due to the winding technique employed in fabrication. The crossing insures that delamination does not occur under stress as in laminated structures.

Figure 3:
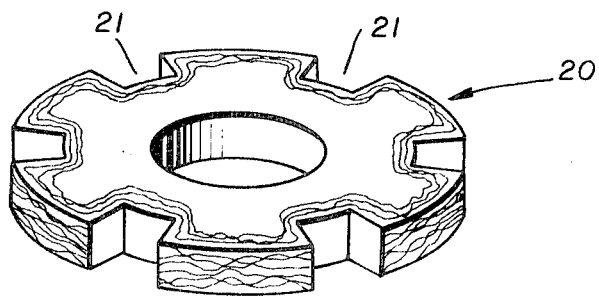
FIG. 3 is a perspective view of the rotor element of FIG. 2.

To better illustrate the ordered direction of the continuous carbon fibers, rotor element 20 is shown in perspective in FIG. 3. For clarity, the carbon fiber has not been drawn in regions other than the one near the periphery of element 20. It is evident from FIG. 3 that the carbon fiber essentially follows the contour of rotor 20 and also crosses over at many positions.

Figure 4:
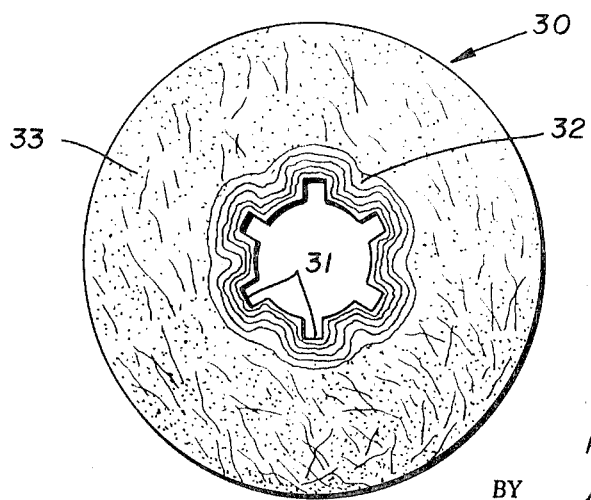
FIG. 4 is a plan view of a stator element having a structure in accordance with another embodiment of the present invention.

FIG. 4 is an illustration of a stator frictional element 30 which also may be utilized in the brake assembly of FIG. 1. As seen in FIG. 4 element 30 is an annular disc having six splines 31 located on the inner periphery thereof. It should be understood that the number of splines is purely a matter of choice. The construction of element 30 is in accordance with another embodiment of my present invention wherein the continuous fibers are utilized only in the region 32 adjacent splines 31. The remaining regions removed from splines 31 are comprised of other fiber configurations such as, for example, a randomly oriented short carbon fiber staple composite. As before, the continuous fibers sweep about splines 31 in an ordered direction which essentially follows the contour of the splined inner periphery thereby strengthening these regions against stress.

As stated above, the stators and rotors alone may establish the necessary friction for causing the aircraft to decelerate, or frictional elements may be inserted therebetween. Alternatively, however, a frictional surface may be applied to both elements in the "friction regions" which are inside the splined region in the case of the rotors and outside the splined region in the case of stators. For example, the region designated by reference numeral 33 in FIG. 4 may be recessed and then filled with appropriate frictional material which has a different frictional behavior i.e., different coefficient of friction) than the carbon composite.

It should also be noted that the materials utilized as the matrix may be of any carbonaceous material or material which yields a carbonaceous residue upon high-temperature pyrolysis. An example of such a matrix material is a phenolic resin containing dispersed particulate carbon or graphite.

EXAMPLE

To more completely describe the present invention, reference is now made to the following example which illustrates a technique of fabricating the structure of my present invention.

This example is directed toward the construction and testing of a rotating disc, i.e., a rotor utilized in a frictional brake assembly. Initially a carbon fiber such as, for example, that obtainable from Hitco Materials, Division of H. L. Thompson Company, Gardena, Calif., under the stock designation HMG-50, is coated with a resin material containing powdered graphite to give a resin fiber powdered-graphite weight ratio of about 40:45:15. The resin solution may be any resin solution which yields a carbonaceous residue upon pyrolysis. For example, I have found it convenient to utilize a solution comprised of the following: materials approximately 64.5 percent by weight of a phenolic varnish, 12.4 percent by weight of a particulate carbon composition such as graphite powder stock designation SW 1,651(from the South West Graphite Co., Burnett, Tex.); and methylethyl ketone of approximately 23.1 percent by weight. The ketone acts as thinner to give the solution a workable consistency.

The coated fiber is fed to a rotating cylindrical mandrel at an appropriate speed, e.g., 100 feet per minute. It is preferred, as explained below, that the fiber be wound helically across the drum as well as around the circumference thereof. To ensure that the resin does not adhere to the mandrel, it is convenient to cover the mandrel with an appropriate release paper prior to winding.

Removing the solvent is accomplished by drying the resin-fiber band on the mandrel while rotating slowly in air at room temperature. Any residual solvent may be removed by placing the band in an oven at about 150° F. for several hours and by placing the resin-fiber band in a vacuum at room temperature for several hours.

The band is removed from the mandrel, heated to a softened state, and forced into a preform. The preform has the same general shape as the final splined peripheral shape of the desired article, e.g., a stator having splines about the inner periphery. The remaining volume of the preform is filled with an appropriate mixture of fiber, powdered graphite (particulate carbon), and resin (yielding a carbonaceous residue upon pyrolysis). It should be noted at this point that the entire volume may be filled with continuous fiber-resin mixture or a resin particulate-carbon mixture when desired instead of using a staple fiber-resin mixture.

The now substantially planar preform-shaped article is inserted into a mold having the final desired shape, and a force generating a pressure on the order of 3,000 pounds/square inch is applied in an axial direction to the windings. That is, the force is applied normal to the rotational plane(s) of the winding when on the rotating mandrel. This is necessary in order that winding in the final state will have the desired preferred direction.

It is preferred that the preform-shaped article be made with a smaller outer diameter and, when annularly shaped, a larger internal diameter than the mold to facilitate placement of the article therein. The axial pressure imposed against the article causes it to fill the final mold and closely follow the contours thereof. The carbon fibers are practically inelastic and must of necessity possess some freedom of movement in order that the band may readily follow the contours of the preform mold and subsequently the final mold. By helically or sinuisoidally winding the fiber on the rotating mandrel, a geometric configuration of winding is preferred which permits the needed fiber movement during molding.

The molded article is pyrolized at approximately 1,800° C. for about 8 hours until the article becomes an essentially all-carbon composite 99 percent carbon or greater). To ensure that porosity resulting from shrinkage is minimized, the molding article may be repeatedly reimpregnated with, for example, furfuryl alcohol and then repyrolyzed.

To illustrate the comparative strength of a disc constructed in accordance with my present invention, a test was conducted on the ultimate strengths in the splined regions of an all-carbon composite rotor having only staple fibers, a laminated woven carbon fabric rotor, and a rotor in accordance with the present invention. A hydraulically actuated metal bar was placed against a spline of a rigidly held rotor, and a force was applied tangential to the rotor. At a force which created a pressure of 1,200 lbs/in.$^2$, the spline of the carbon staple rotor broke. The woven carbon rotor broke at a pressure of 3,000 lbs./in.$^2$. In contrast thereof, a rotor constructed in accordance with the present invention remained integral under pressures of 3,000 lbs./in.$^2$ and above.

In light of the foregoing, it should be readily appreciated that the advantages and objectives as set forth hereinbefore are readily attained through a planar frictional device and fabrication technique in accordance with my present invention. The increased strength in the peripheral regions of a substantially all-carbonaceous matrix is provided by the presence of continuous high-tensile-strength carbon fibers having an ordered direction which essentially follows the contour of the periphery of the planar frictional device. Thus, the planar frictional device is useful not only in frictional brakes as described, but in any mechanism which experiences high stresses such as, for example, a disc-type clutch.

While the invention has been set forth with respect to certain embodiments and specific examples thereof, many modifications and changes will readily occur to those skilled in the art. Accordingly, by the appended claims, I intend to cover all such modifications and changes which fall within the true spirit of the present invention.

I claim:

1. A substantially all-carbon composite annular disc having splines along one periphery thereof, said disc comprising a band of continuous carbon fibers in a carbonaceous matrix, said band of carbon fibers being located in a narrow region adjacent to said one periphery and substantially following the contour of said one periphery wherein the remaining region of said disc contains carbon fiber staple in a carbonaceous matrix.

2. The disc of claim 1 wherein said one periphery is the outer periphery of said annular disc.

3. The disc of claim 1 wherein said one periphery is the inner periphery of said annular disc.

4. The disc of claim 1 in which a material having different frictional characteristics from said all-carbon composite is secured to the planar surfaces of said disc.

* * * * *

PO-1050
(5/69)

UNITED STATES PATENT OFFICE
CERTIFICATE OF CORRECTION

Patent No. 3,639,197   Dated February 1, 1972

Inventor(s) Raymond G. Spain

It is certified that error appears in the above-identified patent and that said Letters Patent are hereby corrected as shown below:

> Please correct the patent to show that it was assigned to The Bendix Corporation instead of Monsanto in accordance with the Assignment which was recorded August 11, 1971 at Reel 2754 and Frame 509
>
> Signed and sealed this 13th day of June 1972.

(SEAL)
Attest:

EDWARD M. FLETCHER, JR.
Attesting Officer

ROBERT GOTTSCHALK
Commissioner of Patents